Oct. 19, 1937.  F. A. WETTSTEIN  2,096,079
STEAM OR GAS TURBINE
Filed Jan. 17, 1936   6 Sheets-Sheet 1

Inventor
Fritz Alexander Wettstein
By Cameron, Kerkam + Sutton
Attorneys

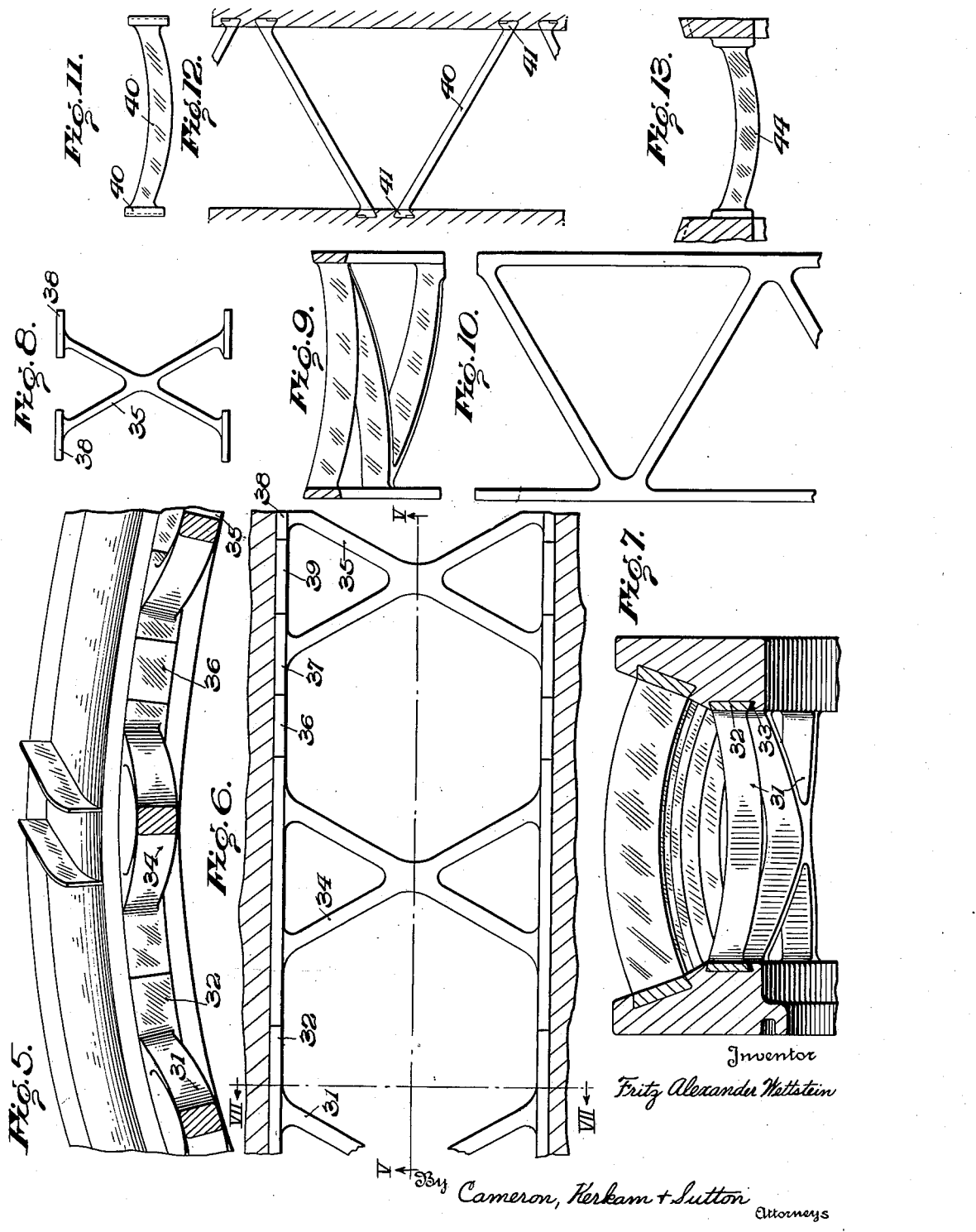

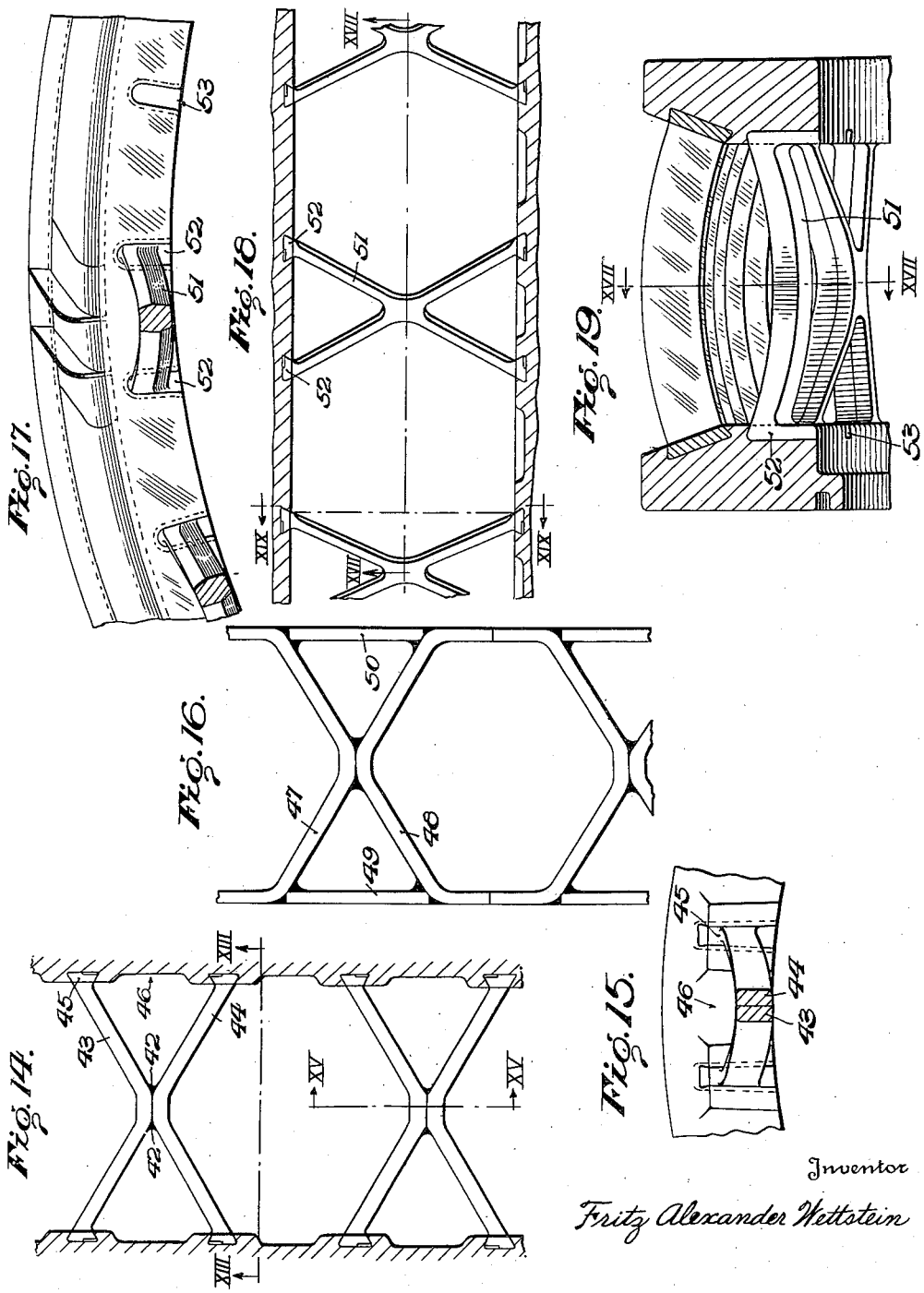

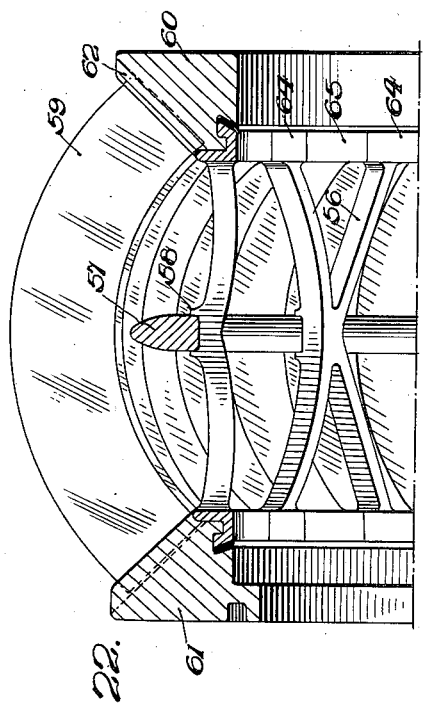
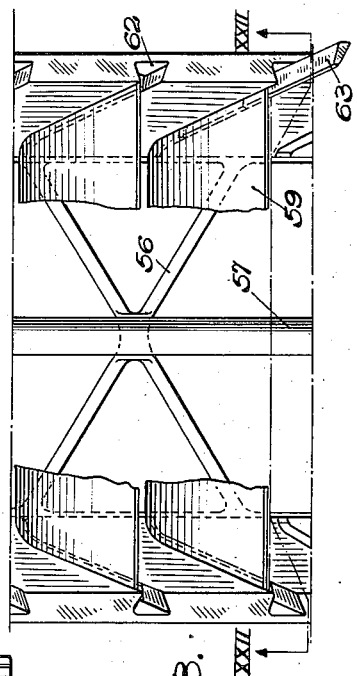
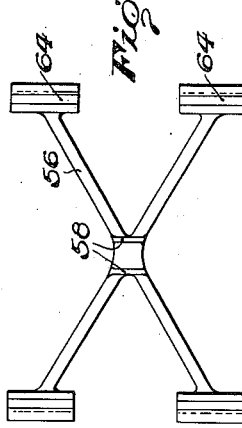
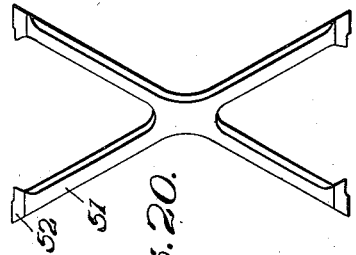
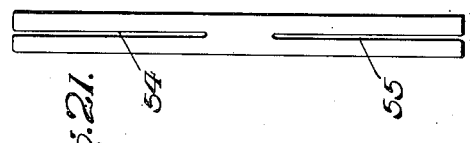

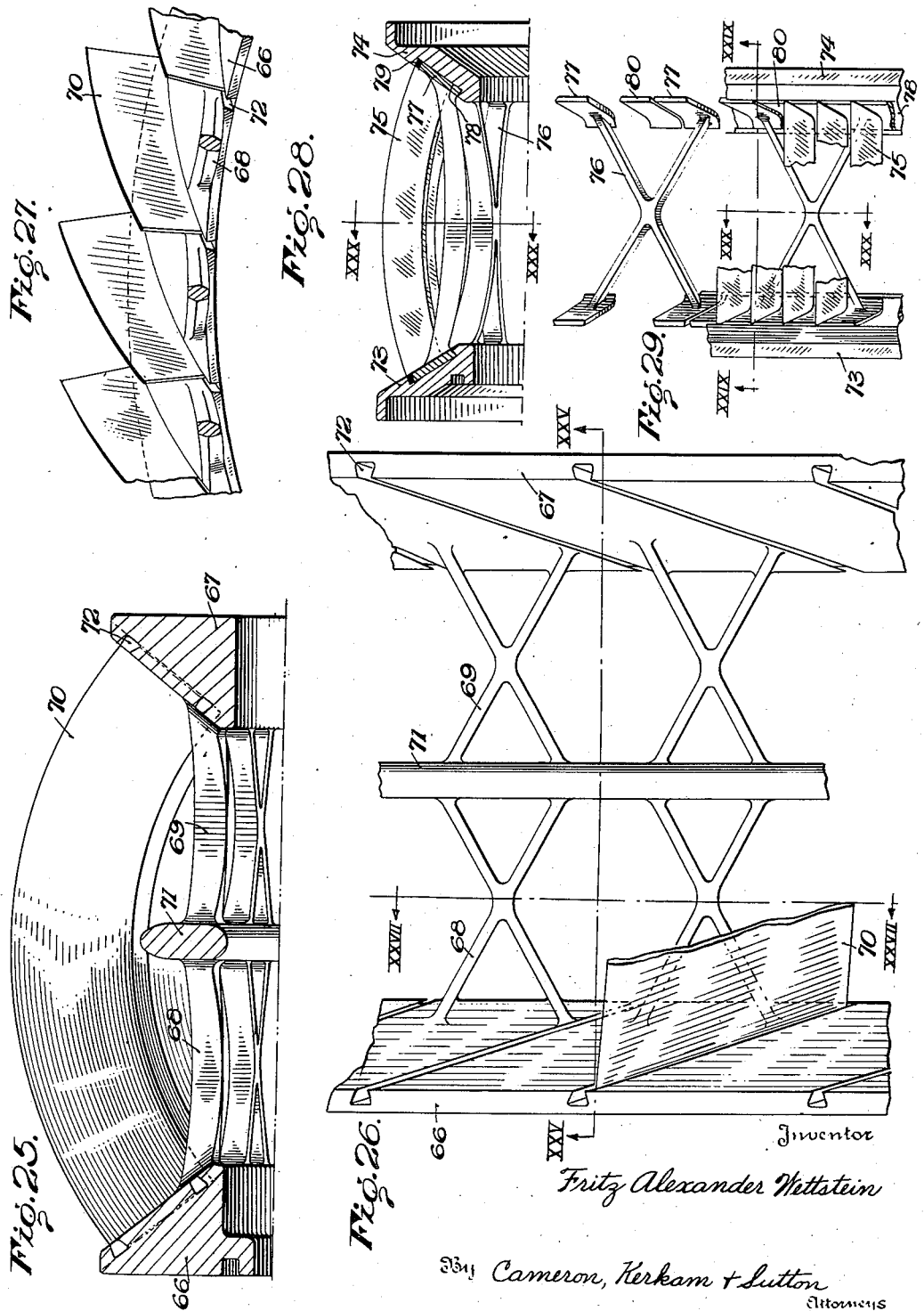

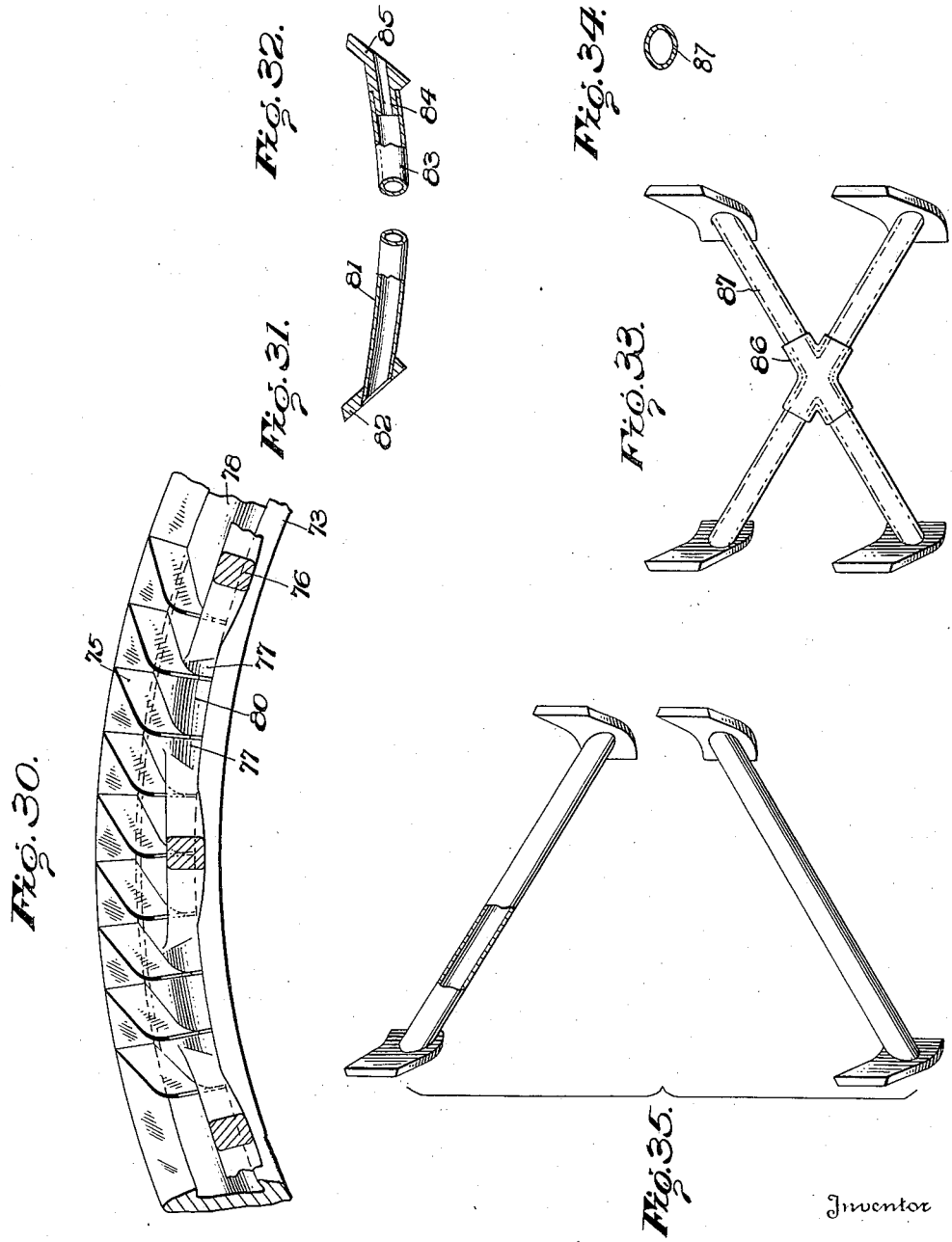

Patented Oct. 19, 1937

2,096,079

UNITED STATES PATENT OFFICE 2,096,079

STEAM OR GAS TURBINE

Fritz Alexander Wettstein, Stockholm, Sweden, assignor to Aktiebolaget Spontan, Stockholm, Sweden, a corporation of Sweden Application January 17, 1936, Serial No. 59,635
In Germany January 17, 1935

19 Claims. (Cl. 253—77)

The present invention relates to rotors for radial flow steam or gas turbines, and more particularly to rotors of the type wherein the blades extend in the form of centrifugal catenary lines between axially spaced blade carrying or retaining rings and the rings are interconnected by struts.

In order to attain the highest possible peripheral velocities, it is desirable that the rotor construction be such that substantially only tensile stresses arise in the blades and only compression stresses in the struts. For the same reason, it is desirable that the bearing or reaction forces of the blades and struts exert no bending moments on the blade carrying rings, so that substantially only purely tensile stresses arise in these rings also. The principal object of the invention is therefore to provide a novel rotor construction capable of fulfilling these conditions which, in hitherto known constructions of radial flow, curved blade rotors, it has often been difficult or impossible to meet, particularly when the blades extend in relatively flat curves.

In order that the nature of the invention may be more clearly understood, the following explanation of the conditions existing in a rapidly rotating turbine rotor should first be considered. Since the two blade carrying rings are interconnected only by the blades and the struts, the axial components of the bearing forces of the blades and struts arising through the action of centrifugal force must nullify or balance each other. The resultants of these bearing forces exerted on the carrying rings are thus directed radially and are each of a magnitude equal to half the centrifugal load of blades and struts. The positions of the effective points of application of these resultant forces are determined by the points of intersection of the bearing forces of the blades and struts. The load on the ring must be nullified or balanced by an equally great and oppositely directed tensional force, which is produced by a corresponding load or strain on the blade carrying rings. This tensional force is the resultant of all tensions over the ring cross section, and its point of application is the tensional center of gravity (center of gyration) of the ring cross section which, in the first approximation, corresponds with the center of gravity of the ring cross section. The greater the radial distance between the points of attachment of blades and struts to the carrying rings and the flatter the curvature of the blades, the further the intersecting points of the bearing forces shift axially outwardly from the central planes of the blade rings and the greater the distance becomes between these intersecting points and the centers of gravity of the cross sections of the ring, whereby the rotary moments become correspondingly greater. These rotary moments tend, so to speak, to overturn or tilt the blade carrying rings out of their normal planes perpendicular to the rotor axis. Additional bending tensions can thereby arise in the carrying rings as well as in the blades and struts.

These defects are overcome according to the present invention by locating the attachments of the struts to the carrying rings wholly or partially between adjacent blade attachments, and/or by providing the blade carrying rings on their inner adjacent sides with additional loads— for example, by subdividing the grid-like strut assemblage peripherally or circumferentially, or by cutting grooves into portions of the carrying rings—in such manner that the resultants of the bearing forces of all elements, such as blades, struts, etc., carried by the blade carrying rings pass through or approximately through the tensional centers of gravity, or centers of centrifugal loads, of the cross sections of the rings.

The overturning or tilting moments for the blade carrying rings thereby disappear, and only purely tensional stresses arise in the rings and curved blades and purely compression stresses in the struts. With purely tension or compression stresses, in contrast to bending stresses, the strength of the material is completely utilized, thereby enabling the use of the lightest possible construction. This is an advantage of great importance in the construction of turbine rotors and permits of attaining high peripheral velocities. In addition, the use of smaller cross sections of material permits the making of allowances for retaining the heat tensional forces within low values.

As previously indicated, the occurrence of bending tensions is avoided in the present invention, for example, by subdividing the strut anchoring means at peripherally spaced points. The attaching arrangement of the struts to the blade carrying rings then forms an additional load on the inner adjacent sides of the rings, which load acts oppositely to the overturning moment exerted by the blades and struts on the rings.

By subdividing the strut connections peripherally into a number of equal parts, manufacture of the rotor is also made less expensive, since cheaper operative methods may be employed, and a saving in material is effected.

These and other advantages and features of the invention will appear more fully upon consideration of the description of the various embodiments illustrated in the drawings which follows. Referring now to the drawings, wherein like reference characters indicate like parts throughout the several views:—

Figure 3:
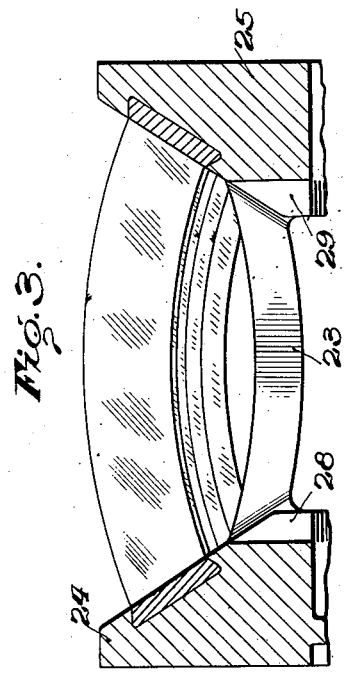
Figs. 3 and 4 are views similar to Figs. 1 and 2 of another form of rotor embodying the invention, Fig. 3 being taken substantially on line III—III of Fig. 4.
Figure 4:
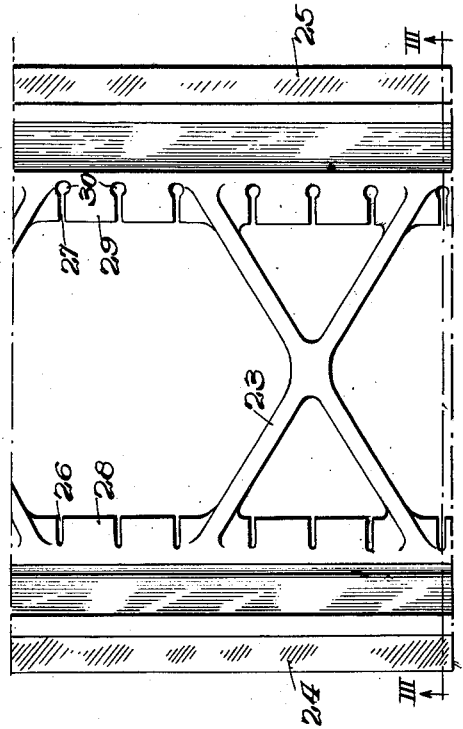
Figure 1:
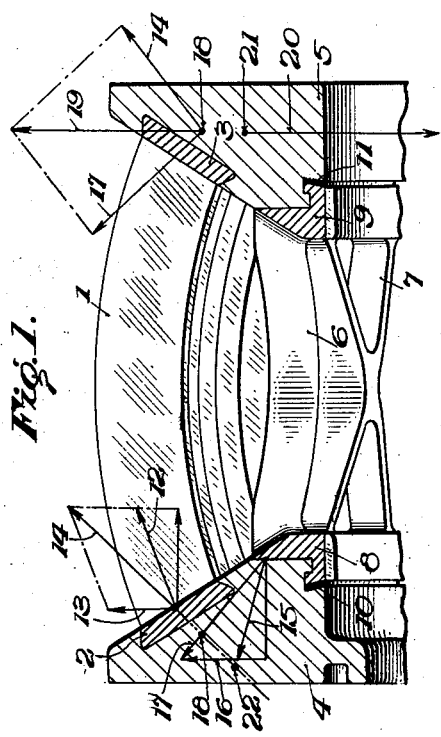
Fig. 1 is a cross section of a portion of one form of rotor of a radial flow turbine constructed in accordance with the invention, the section being taken substantially on a plane passing through the rotor axis.

Figs. 5–8 show still another embodiment of the invention, Figs. 5 and 7 being sections taken substantially on lines V—V and VII—VII, respectively, of Fig. 6, the latter being a plan view of a portion of a strut assemblage similar to that shown in Fig. 1 with the inner portions of the blade carrying rings shown in section, and Fig. 8 being a plan view of one element of the strut assemblage of the rotor of Figs. 5–7;

Figs. 9 and 10 are sectional and plan views, respectively, of a portion of another form of strut assemblage;

Fig. 11 is an elevation of a still different strut element, while Fig. 12 illustrates the manner of attachment thereof to the blade carrying rings;

Figs. 13–15 illustrate another form of strut assemblage, Figs. 13 and 15 being sections taken substantially on lines XIII—XIII and XV—XV, respectively, of Fig. 14 which is a plan view of the struts with the blade carrying rings shown in section;

Fig. 16 is a plan view of a portion of still another strut assemblage;

Figs. 17–20 are views similar to Figs. 5–8 of another form of rotor embodying the invention;

Fig. 21 is a plan view of a split bar or rod from which the strut of Fig. 20 may be economically formed;

Figs. 22 and 23 are sectional and plan views, respectively, of a portion of a still different rotor construction, the rotor blades in Fig. 23 being broken away to show the strut construction. Fig. 24 is a plan view of one of the strut elements of Figs. 22 and 23;

Figs. 25–27 show a portion of another rotor constructed in accordance with the invention, Fig. 26 being a plan view and Figs. 25 and 27 being sections taken substantially on lines XXV—XXV and XXVII—XXVII, respectively, of Fig. 26;

Figs. 28–30 are views similar to Figs. 25–27 of another rotor embodying the invention; and Figs. 31–35 are sectional and plan views showing details of various other forms of strut elements of tubular construction adapted for use in connection with the invention.

Referring first to Fig. 1, 1 designates a curved turbine blade which is attached or anchored at both ends by means of intermediate members 2 and 3 in suitable circumferentially extending retaining grooves formed in the axially spaced blade carrying rings 4 and 5. The blades are preferably made of relatively thin sheet metal and during rotation are subject to the influence of centrifugal force which in turn sets up tensile forces tending to pull or draw together the two rings 4 and 5. This is prevented, however, by the strut assemblage consisting of the X-shaped members 6 and 7 which are subject to compression. The obliquity, or X-form, of the struts serves to increase the rigidity of the rotor assemblage of blades and rings. As shown, the struts also bend or sag toward the interior of the rotor whereby, no bending stresses, but only purely pressure stresses, arise in the struts under the influence of their centrifugal load and their lateral shifting toward each other.

Figure 2:
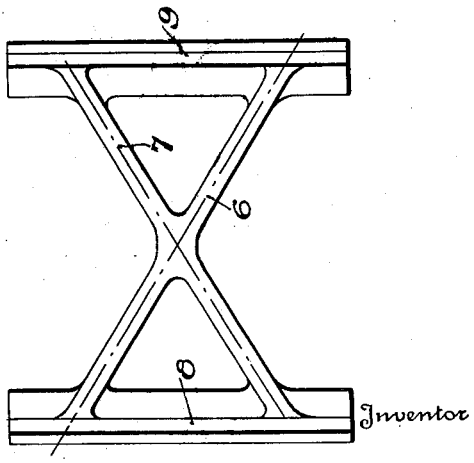
Fig. 2 is a plan view of a portion of the subdivided strut assemblage of the rotor of Fig. 1.

As clearly shown in Figs. 1 and 2, the ends of each pair of struts 6 and 7 are connected with a pair of arcuate attaching members or feet 8 and 9 having outwardly turned lips or flanges which fit in corresponding grooves formed in rings 4 and 5 and are secured therein by rammed-in packing material 10 and 11.

Fig. 1 also shows by means of vectors the bearing forces which are set up when the rotor is in operation. For example, 12 designates the tensional force exerted through the action of centrifugal force by blades 1 on carrying ring 4, while 13 represents the radial force exerted by the intermediate members 2. 14 is the resultant of forces 12 and 13. On the other hand, the struts 6 and 7 exert a radial force 15 on the ring 4, while the anchoring feet 8 and 9 produce radial loads 16. The resultant 17 of the forces 15 and 16 is the total reaction force exerted by the strut assemblage on the ring 4. The point of intersection 18 of this reaction force 17 and the extension of resultant force 14 determines the effective point of application of the total resultant 19, which, for convenience, is shown at the right on ring 5. This resultant load 19 is maintained in equilibrium or balanced by the equally great and oppositely directed tensional force 20 of the ring.

In the foregoing case, as seen, the point of application 18 of the resultant 19 of the bearing forces lies in the same plane perpendicular to the rotational axis of the rotor with the center of gravity 21 of the ring cross section; consequently, there is no rotary or overturning moment exerted on the carrying ring. If, in contrast thereto, the strut assemblage is made in one piece, as in known arrangements, with the feet 8 and 9 united with a complete ring, the rings become self-bearing and the points of intersection of the bearing forces obviously shift to positions such as that occupied by a point 22 in Fig. 1. Since this point does not lie in the same radial plane with the center of gravity of the ring, there arises in the ring a rotary moment which tends to overturn or tilt it.

It is thus apparent, as shown on Figs. 1 and 2, that by subdividing the strut assemblage at peripherally spaced points additional loads arise at the inner adjacent sides of rings 4 and 5 through the strut feet 8 and 9, which additional loads oppose or entirely eliminate the rotary moments exerted on the rings by the blades and struts.

Subdivision of the strut assemblage into a number of partial elements, as shown in Fig. 2, also reduces the cost of production of this assemblage. If the latter is made in one piece, the struts must be machined from a solid rim with proportionately larger labor costs and waste of material. Partial elements like that shown in Fig. 2, however, may be made by much less expensive procedures, for example, by die or drop forging, and the result is also a considerable economy of material. In addition, the manufacture of a large number of small parts is per se an economical measure as compared with the production of a large complicated structure.

In the exemplary embodiment shown on Figs.

3 and 4, on the other hand, the struts 23 are made integral with the blade carrying rings 24 and 25. The latter are partially cut through at their inner adjacent sides by peripherally spaced, radially extending grooves or notches 26 and 27, the resulting projections or shoulders 28 and 29 forming weights on the inner sides of rings 24 and 25. These weights are equally as large and have the same action as the strut feet 8 and 9 of Figs. 1 and 2, in that they nullify the rotary moments exerted on the rings by the blades and struts. The grooves thus formed in the carrying rings may be suitably provided at their inner ends with enlarged grooves or spaces as indicated at 30 by drilling or boring, thus reducing the danger of fracture of the rings.

In the embodiment of Figs. 5–7, the strut assemblage is also subdivided peripherally into X-shaped members 31. The feet 32 of these members are so formed that they fit into circular tracks or grooves turned in the inner adjacent sides of the rings, and are retained therein by rammed-in packing pieces 33. The feet of the X-shaped members may be made so that they abut each other peripherally, as shown for the adjacent members 31 and 34 in Figs. 5 and 6, or there may be left between the feet of two adjacent members an intermediate space, like that between the members 34 and 35, said space being filled with the filler material or spacer member 36 so as to maintain the proper positions of the members. In order to facilitate production and avoid heat tensions on hardening, it may be preferable to make the feet 37 and 38 of the X-shaped member 35 separately, as shown in Figs. 6 and 8. With this construction, filler members 39 (Fig. 6) are inserted between the adjacent strut feet 37 and 38.

Figs. 9 and 10 show a member of a strut assemblage having a form approximately that of the capital letter N; and it is obvious that the form of the strut assemblage may be widely varied, as may also the manner in which the assemblage is subdivided.

In the embodiment of Figs. 11 and 12, the struts 40 are each made separately and provided with dovetailed feet 41 which are inserted radially from the inside outwardly in corresponding grooves formed in the blade carrying rings.

In the embodiment of Figs. 13–15, the X-shaped members of the strut assemblage are obtained by welding bent struts 43 and 44 together at 42. The dovetailed feet 45 thereof are inserted radially from the inside outwardly in corresponding grooves formed in the retaining rings. The strut feet and the grooves are preferably, as shown on Fig. 15, constricted or tapered from the inside outwardly so that the struts are clamped tightly in the rings. In case the load through the strut attachment is undesirably great, a portion of the ring material may be machined off, as indicated at 46.

Fig. 16 shows two members of a strut assemblage wherein each is made by welding together four suitably shaped and bent rods 47, 48, 49 and 50.

In the construction shown in Figs. 17, 18 and 19, the X-shaped members 51 of the strut assemblage are inserted by their dovetailed feet 52 in radially directed grooves 53 formed in the blade carrying rings. The grooves 53 do not pass entirely through the rings in a radial direction but are open at their radially innermost ends and closed at their radially outermost ends, thus determining the radial position of the X-shaped parts of the strut assemblage. With this construction, the dovetailed feet may be forced into the grooves with a frictional fit and upon rotation of the turbine rotor will be urged thereinto even more tightly by centrifugal force. It is obvious that there is no need in this instance for any specific fastening means to hold the feet in the grooves, although, of course, packing members of any well known construction may be used, if desired. The struts 51 in this embodiment are also beveled off on two opposite sides, as shown. This is advantageous in those cases where the turbine driving medium traverses the struts, not radially, but at a certain angle relative to the peripheral direction of the strut assemblage.

Fig. 20 shows one of the X-shaped members 51 of the strut assemblage of Figs. 17–19. As shown in Fig. 21, this member, in order to save material, may be made, for example, of a rod which is split at both ends as indicated at 54 and 55 but not in the middle, the divided ends then being spread apart and upset at their extremities to form the feet 52.

Figs. 22 and 23 show a portion of a rotor wherein the strut assemblage is again subdivided into partial members 56, one of which is shown in detail in Fig. 24. Since this construction is adapted for a relatively large rotor, the members of the strut assemblage are partially supported by a reinforcing ring 57 disposed intermediate the blade carrying rings 60 and 61. This ring is itself retained in its proper position by the guide lugs 58 projecting outwardly from the members 56. The blades 59, after the rings 60 and 61 are assembled with the strut assemblage, are inserted by their dovetailed feet in correspondingly formed grooves 62, and thereupon secured and retained in said grooves by key members 63 (Fig. 23) which are inserted into the grooves from both ends. In this embodiment also, the feet 64 of the struts together with the intermediate members 65 (Fig. 22) form, in accordance with the invention, loads on the inner adjacent sides of the rings 60 and 61, thus preventing the occurrence of moments tending to overturn or tilt the rings.

According to Figs. 25–27, the occurrence of overturning moments on retaining rings 66 and 67 is prevented by securing the ends of struts 68 and 69 to rings 66 and 67 at positions entirely or partly between the anchored ends of the blades 70, whereby the ends of the struts and blades more or less overlap one another when viewed in the peripheral direction. It is thereby obviously possible to shift the points of intersection of the bearing forces of the blades and struts into the same planes at right angles to the rotational axis of the turbine with the centers of centrifugal loads (centers of gyration) of the rings. In this case, the struts 68 and 69 are made integral with the rings 66 and 67 as well as with the intermediate retaining ring 71. The blades 70 are inserted by their dovetailed feet in corresponding obliquely directed grooves 72 in rings 66 and 67. Parts of grooves 72 thereby extend between the attaching points of the struts, as clearly shown in the drawings. This construction is well adapted for very high peripheral velocities, thus particularly for the last ring of blades of a turbine, as the extra load on the blade carrying rings created by separate feet is absent. The telescopic or overlapping attachment of blades and struts is of further advantage in that the radial extent of the rotor is reduced, which is of greater importance with radial flow turbines and renders possible an increase of the sum of the squares of the peripheral velocities.

Figs. 28–30 show a construction wherein overturning moments on the rings 73 and 74 are precluded by partially crossing or overlapping the curved blades 75 and the struts 76 at their ends. In this exemplary embodiment, the struts 76 are not integral with the retaining rings 73 and 74, but are secured thereto by means of enlarged feet 77 which are inserted in peripherally extending grooves or tracks 78 and retained therein by packing as indicated at 79. Feet 77 have the same form as the intermediate spacing members 80 and serve simultaneously therewith for spacing and retaining the enlarged ends of blades 75 in grooves 78.

Finally, Figs. 31–35 indicate various forms of strut construction using tubular members for the struts. As previously stated, the struts are subjected to compression stresses and therefore exposed to the danger of fracture. For this reason the use of tubing is particularly advantageous; in addition, struts made of tubing are light in weight as compared with their strength.

As Fig. 31 shows, the strut tubes 81 may be inserted in holes drilled or otherwise formed in the feet 82 and welded together therewith. On the other hand, the feet may have the form shown in Fig. 32, made by forging, and the tubes 83 may be forced or pressed on the tubular extension members 84 of the feet 85, or may be screwed thereon.

Fig. 33 shows an X-shaped member of a strut assemblage which is made of tubes in the above manner, the tubes 87 being united at the center of the strut by an X-shaped member 86. As shown in Fig. 34, the tubular struts 87 are preferably of elliptical cross section, the greatest axis of the ellipse being directed substantially radially, whereby the resistance offered to the flow of the turbine driving medium is reduced to a minimum. Fig. 35 shows two simple strut tubes which are made in similar manner.

Although a number of different rotor and strut constructions have been described and illustrated in detail in the accompanying drawings, it is to be expressly understood that these drawings are for purposes of illustration only and are not to be construed as defining the scope of the invention which is obviously capable of a variety of mechanical embodiments. Reference is therefore to be had to the appended claims for a definition of the limits of the invention.

What is claimed is:

1. In a rotor for radial flow turbines, the combination of a pair of axially spaced rotatable blade carrying rings, a plurality of blades anchored at their ends to and extending in catenary-like form between said rings, and a plurality of struts interconnecting said rings, said blades and struts being so constructed and arranged relatively to one another and so attached to said rings that the resultant of the forces acting on each ring during rotation thereof is directed substantially through the center of centrifugal loads of the sectional area of said ring.

2. A rotor construction according to claim 1 wherein the ends of said struts are connected to said blade carrying rings at points intermediate the points of anchorage of said blade ends to said rings.

3. A rotor construction according to claim 1 wherein the ends of said struts lie between and are connected to said blade carrying rings at points between the blade ends so as to overlap therewith when viewed in a circumferential direction.

4. A rotor construction according to claim 1 wherein the struts are formed in separate arcuate sections peripherally of the rotor and each section is secured to said blade carrying rings independently of the other sections.

5. A rotor construction according to claim 1 wherein the struts are formed in separate arcuate sections peripherally of the rotor, each of said strut sections being substantially X-shaped in plan and having enlarged feet formed at the ends of the crossed elements thereof for attachment to said blade carrying rings.

6. A rotor construction according to claim 1 wherein said struts are tubular in form and have secured to their ends enlarged feet by which they are connected to said blade carrying rings.

7. A rotor construction according to claim 1 wherein said blade carrying rings are provided with blade retaining grooves formed in the peripheries thereof in which the blade ends are anchored, at least a portion of each of said grooves passing between the points of attachment to said ring of two adjacent struts.

8. A rotor construction according to claim 1 wherein the inner adjacent sides of said blade carrying rings are specially loaded in such manner as to adjust the positions of the resultants of the forces acting on each ring during rotation from those that would exist in the absence of said special loads to those in which the resultants pass substantially through the centers of centrifugal loads of the sectional areas of said rings.

9. A rotor construction according to claim 1 wherein the inner adjacent sides of said blade carrying rings are provided with retaining grooves in which the ends of said struts are anchored.

10. A rotor construction according to claim 1 wherein the inner adjacent sides of said blade carrying rings are provided with a plurality of circumferentially spaced, radially extending retaining grooves in which the ends of said struts are anchored.

11. A rotor construction according to claim 1 wherein the inner adjacent sides of said blade carrying rings are provided with annular retaining grooves extending entirely around said rings in which the ends of said struts are anchored.

12. A rotor construction according to claim 1 wherein the inner adjacent sides of said blade carrying rings are provided with a plurality of circumferentially spaced, radially extending grooves of such size, number and location as to adjust the positions of the resultants of the forces acting on each ring during rotation from those that would exist in the absence of said grooves to those in which the resultants pass substantially through the centers of centrifugal loads of the sectional areas of said rings.

13. A rotor construction according to claim 1 wherein each of said blade carrying rings is provided with a circumferentially extending retaining groove formed in the periphery thereof in which the ends of both said blades and said struts are anchored.

14. A rotor construction according to claim 1 wherein for radial flow turbines comprising each of said blade carrying rings is provided with a circumferentially extending retaining groove formed in the periphery thereof in which the ends of both said blades and said struts are anchored, said strut ends being so constructed as to also constitute means for spacing the blade ends the required distances apart and retaining the latter in said grooves.

15. A rotor construction according to claim 1 wherein each of said blade carrying rings is provided with a circumferentially extending retaining groove formed in the periphery thereof in which the ends of both said blades and said struts are anchored, said strut ends being enlarged in the circumferential direction of said rings and being inserted in said grooves between adjacent blade ends whereby said strut ends also constitute means for spacing the blade ends the required distances apart and anchoring the latter in said grooves.

16. A rotor for radial flow turbines comprising a pair of axially spaced rotatable blade carrying rings, a plurality of blades extending in catenary-like form between said rings, and a plurality of struts interconnecting said rings, said struts being divided into a plurality of separately formed sections peripherally of the rotor with each section removably secured to said rings independently of the others.

17. A rotor construction according to claim 16 wherein the blade carrying rings are provided with a plurality of retaining grooves in which the ends of said strut sections are anchored, said grooves and strut ends being so constructed and arranged that the latter may be inserted in the former by a radially outward movement of each strut section.

18. A rotor construction according to claim 16 wherein the ends of said strut sections are connected to said blade carrying rings at points between the blade ends such that the strut and blade ends overlap one another when viewed in a peripheral direction.

19. A rotor construction according to claim 16 wherein each of said blade carrying rings is provided with a retaining groove in which the ends of both the blades and the struts are secured.

FRITZ ALEXANDER WETTSTEIN.